H. D. ARNOLD AND J. P. MINTON.
METHOD OF AND SYSTEM FOR TESTING TRANSMITTERS OR RECEIVERS.
APPLICATION FILED NOV. 12, 1917.
1,426,807.
Patented Aug. 22, 1922.
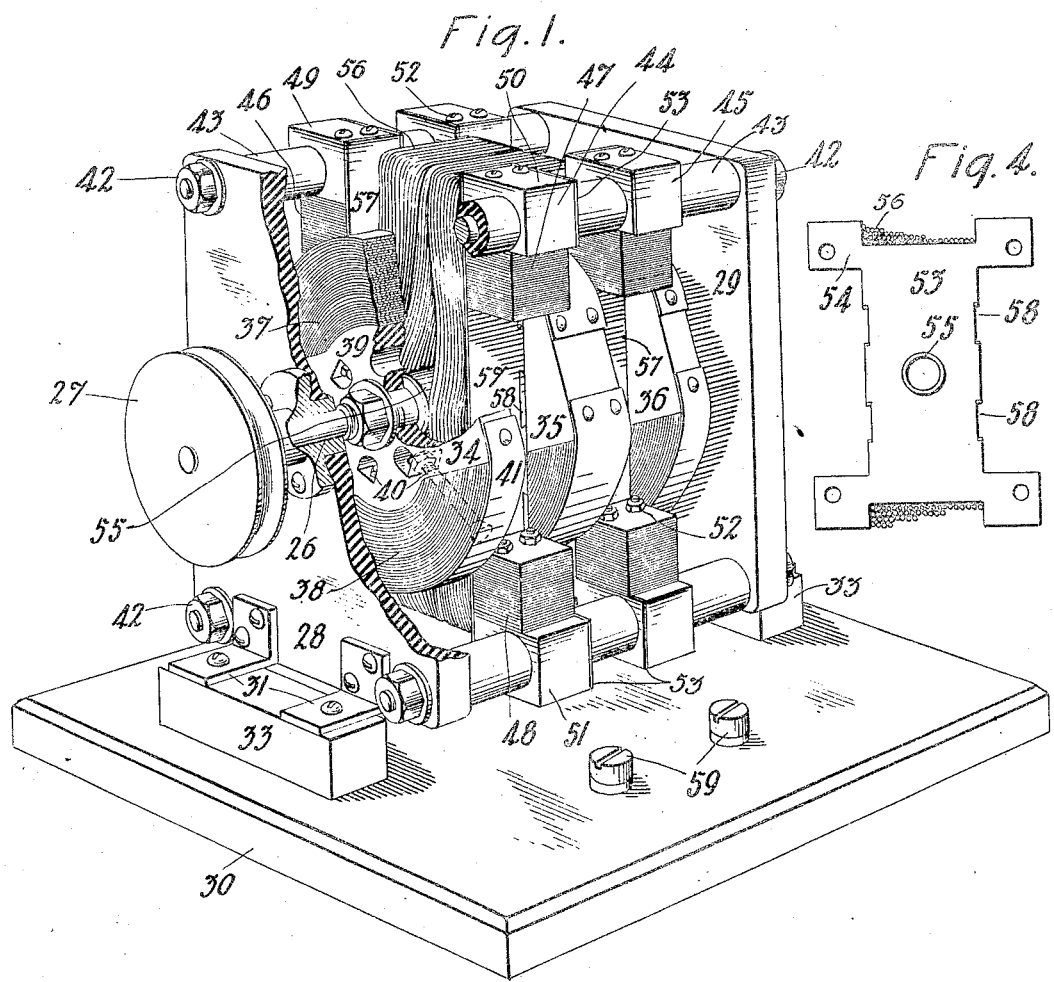
Fig. 1.
Fig. 4.
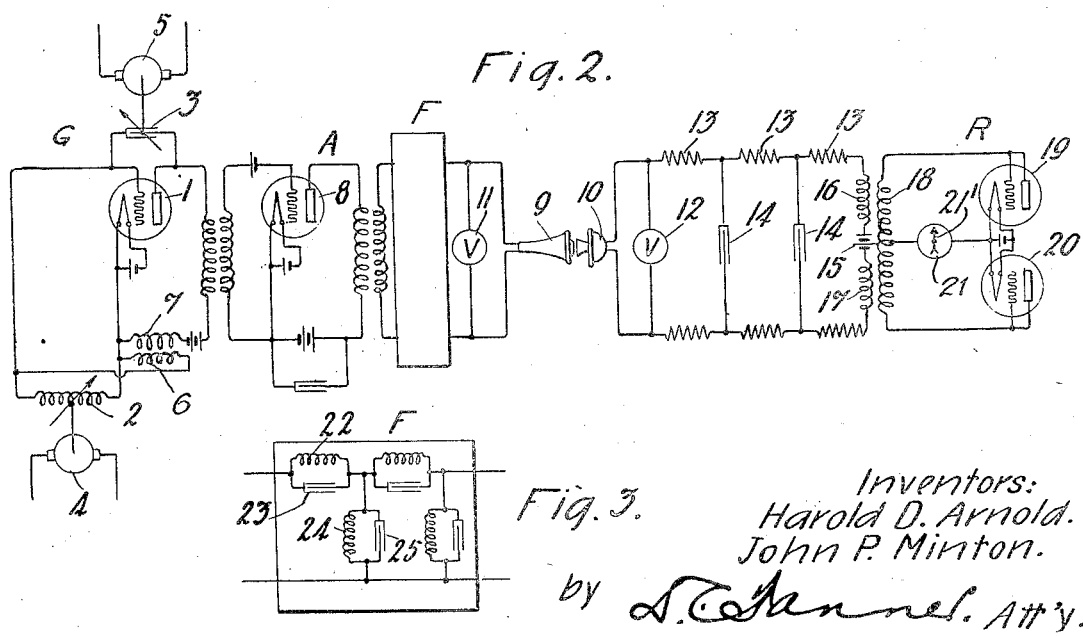
Fig. 2.
Fig. 3.
Inventors:
Harold D. Arnold.
John P. Minton.
by S. E. Hunnel, Att'y.

UNITED STATES PATENT OFFICE.

HAROLD D. ARNOLD AND JOHN P. MINTON, OF EAST ORANGE, NEW JERSEY, ASSIGNORS TO WESTERN ELECTRIC COMPANY, INCORPORATED, OF NEW YORK, N. Y., A CORPORATION OF NEW YORK.

METHOD OF AND SYSTEM FOR TESTING TRANSMITTERS OR RECEIVERS.

1,426,807. Specification of Letters Patent. Patented Aug. 22, 1922.

Application filed November 12, 1917. Serial No. 201,565.

*To all whom it may concern:*

Be it known that we, HAROLD DE FOREST ARNOLD and JOHN P. MINTON, citizens of the United States, both residing at East Orange, in the county of Essex and State of New Jersey, have invented certain new and useful Improvements in Methods of and Systems for Testing Transmitters or Receivers, of which the following is a full, clear, concise, and exact description.

This invention relates to a method of and system for testing the comparative efficiency of telephone transmitters or receivers and for testing the component parts thereof, such as their diaphragms, and also the granular carbon employed in the transmitter.

The invention makes use of a source of sound, for example, a telephone receiver, which acoustically operates the apparatus under test, that is, the transmitter, or receiver, or component parts thereof. A source of energy is connected to the receiver and the alternating current energy produced thereby in the apparatus under test is measured and compared with the results obtained when other apparatus is tested under like conditions. In this way it may be determined if the element tested, that is, transmitter, receiver, diaphragm or granular carbon, measures up to the chosen standard of efficiency.

It is well known that telephone currents produced by speaking into a transmitter are very complex and may be considered as made up of currents of various frequencies, extending over the acoustic range. It is desirable in testing telephone devices to duplicate actual working conditions as nearly as possible, while obviating the necessity of actually employing currents produced by the voice. To this end the invention provides a special form of generator for energizing the receiver which actuates the element under test. This generator supplies current which continuously and cyclically varies in frequency over the important part of the voice frequency range, thereby testing the apparatus at all those frequencies which are most important in speech.

It has been described above that a measuring instrument is employed to indicate the alternating current produced in the testing circuit. Preferably the generator supplies currents which vary in frequency sufficiently rapidly so that the needle of the measuring instrument gives a steady indication. Since the frequencies supplied by the generator vary over the important part of the voice frequency range, it will be apparent that the average response is indicated over this range, which is the important range in talking.

Ordinary diaphragms, as is well known, are not equally responsive at all frequencies. Hence, if in the above testing system, a constant current were supplied to the receiver, its diaphragm, having a non-uniform frequency response, would give rise to more intense sounds at some frequencies than at others. This is not important in case comparative tests are being made, since all of the elements under investigation are tested under like conditions. If it is desired to investigate the frequency response characteristic of the element under test, or, if for any other reason it should seem desirable, the receiver diaphragm may be actuated so as to give rise to equally intense sounds at all frequencies. This is done by associating with the alternating current generator and the receiver a circuit whose impedance varies with frequency, thus admitting to the receiver a current whose amplitude varies so as to produce the desired intensity of sound at each frequency. For this purpose, the circuit is so designed as to partly exclude from the receiver current of those frequencies to which the receiver is most responsive.

Due to the fact that the transmitter or receiver diaphragms are more responsive to some frequencies than to others, and since the frequency response of one diaphragm would, in general, be different from that of another, it is necessary that the frequencies supplied by the generator should vary in a special manner in order to obtain results from which comparative efficiencies may be accurately determined. If the generator were to supply currents which varied less rapidly over one frequency band than over others, then a diaphragm which had a resonant peak coinciding with that frequency band would give a larger indication than a diaphragm having a resonant peak outside of that frequency band even though the average response of both diaphragms might be the same throughout the whole range of frequencies employed. In order to avoid discrepancies of this kind, the special manner, above referred to, of varying the frequency is a uniform variation in frequency, i. e., the frequency varies uniformly with time, from minimum to maximum, etc. between the chosen limits of frequency.

The special form of generator which is to supply currents uniformly, cyclically, rapidly and continuously varying in frequency may be an oscillation generator of the audion type. This type of generator supplies current having a frequency which may be controlled by varying either the inductance of the capacity of the generator's oscillation circuit. In this case a specially designed motor-driven inductance is used, the inductance varying in such a manner as to give the desired uniform variation in frequency.

For further details of the invention, reference may be made to the drawing, in which Fig. 1 shows a perspective view with parts broken away, of the variable inductance; Fig. 2 shows diagrammatically a testing system that may be used; Fig. 3 indicates diagrammatically a wave filter; and Fig. 4 is a plan view of a coil supporting plate forming a part of the inductance shown in Fig. 1.

In Fig. 2, the oscillation generator 1 of the audion type supplies current, the frequency of which depends upon the values of the variable inductances 2 and 6, and the variable capacity 3. The inductance 2 is adapted to be continually varied by the motor 4,—the capacity 3, by the motor 5. The variation of inductance 2 or capacity 3 is preferably continual in contradistinction to a step-by-step variation which in this case would be undesirable. For the purpose of this invention, it is proposed to vary only the inductance 2, and this is varied so that the oscillator 1 supplies currents which continuously vary uniformly in frequency over a range of 300 to 3,000 cycles. The special form of inductance which serves this purpose is shown in Fig. 1 and will be later described in detail.

The generator 1 has coils 2 and 6 connected in parallel in its input circuit, and coil 7 in its output circuit, the coils 6 and 7 being inductively related. The currents delivered by the generator 1 may be amplified by the audion amplifier 8 before they are sent to the repeating element comprising the receiver 9 and the transmitter 10. The average voltage across the receiver 9, as observed by means of the voltmeter 11, is maintained constant. A voltmeter 12 may also be provided across the terminals of the transmitter 10. In circuit with the transmitter 10 is provided a suitable electrical load which may be made up, as shown, of series resistance or inductance 13 and shunt condensers 14, having suitable values to simulate the impedence of any desired length of telephone cable. Direct current for the transmitter 10 is supplied by the battery 15, through the coils 16 and 17, inductively related to the coil 18. In circuit with the coil 18 are two rectifiers 19 and 20 connected in opposition so as to rectify the alternating current. The ammeter 21 having pointer 21', measures the rectified current.

In case it is desired to secure from receiver 9 a constant sound intensity throughout the frequency range, between the oscillator 1 and the receiver 9 should be placed a filter F, shown in detail in Fig. 3, the electrical constants of which should be chosen, as indicated above, with due regard to the resonance curve of the receiver diaphragm. This filter serves to equalize the response of the diaphragm for all frequencies by partially suppressing currents of those frequencies for which the diaphragm is most responsive.

The filter F is shown conventionally in Fig. 3 as having series sections of inductance 22 and capacity 23 connected in parallel, and as having shunt sections with inductance 24 and capacity 25 connected in parallel.

If the frequency of the generator is to be controlled by varying the inductance 2 in the generator's oscillation circuit, then one form of inductance that may be used is shown in Fig. 1. The rotation of the shaft 26 varies the amount of magnetizable material in the magnetic circuit of the self inductance coil 56 thereby varying the inductance of this coil. The form of inductance shown in Fig. 1 is such that a uniform rotation of the shaft 26 produces the proper change in inductance to effect a uniform variation in the frequency of the current delivered by the oscillator 1.

The driving motor 4 may be coupled to the shaft 26 by means of a pulley 27. The shaft 26 is rotatably mounted in the end plates 28 and 29 of insulating material. The plate 28 is fastened to the base 30 by means of the angle braces 31, and block 33, the latter being suitably fastened to the base 30. Similar supporting means for the plate 29 are provided. The shaft 26 carries three spaced disc armatures 34, 35 and 36, each of which is provided with opposed pole pieces, such as 37 and 38 of laminated strips of silicon steel for instance. The laminations for armature 34 are suitably fastened to the insulating core 39 by a plurality of bolts and nuts 40 and a retaining band 41. Similar fastening means is provided for the other armatures 35 and 36.

The plates 28 and 29 are provided with four bolts 42, each of which carries a plurality of spacers 43 for suitably spacing the frames 44 and 45 which carry the stationary pole pieces. The frame 44 supports four cubical polar projections 46, 47 and 48, and another one not shown, but positioned below 46 in the same relative positions as 47 and 48. The laminations of each of the pole projections may be of silicon steel and are fastened to corresponding insulating blocks 49, 50 and 51 by means of bolts and nuts 52. The four pole projections and their supporting insulating blocks 49, 50 and 51, are held in position against the outer face of a plate 53 of insulating material, shown in Fig. 4. This plate 53 has four apertured corners 54, which are adapted to receive the supporting bolts 42. The plate 53 is provided with a cylindrical sleeve 55, shown in Figs. 1 and 4, through which the shaft 26 is adapted to pass. The sleeve 55 forms a support for the winding 56, and prevents this winding from coming in contact with the shaft. The windings are prevented from spreading laterally by means of the insulating strips 57, which are fastened at right angles to either side of the insulating plate 53 by means of the dove-tail 58. An insulating supporting frame similar to the plate 53 and the side-pieces 57 is provided on the opposite side of the armature 35, the hubs 55 projecting outwardly in both cases. The inductance of the winding 56 depends upon the relative positions of the stationary and movable magnetic pole pieces. The winding 56 is a single coil of a suitable number of turns, and electrical connections may be made to it by means of the binding posts 59.

The above described variable inductance shown in Fig. 1 is not a part of this invention, for it is the invention of another and is described and claimed in a copending application to R. R. Herrmann, Serial No. 294,217, filed May 2, 1919, for self induction coils.

From the above description it will be apparent that the oscillator 1 supplies to the receiver 9, currents which uniformly, cyclically, rapidly and continuously vary in frequency. The alternating current delivered by the transmitter 10 to its load 13—14 may be observed by means of the measuring instrument 21, the needle 21' of which gives a steady reading by reason of the rapid variation in frequency. For the purpose of comparison, other transmitters or receivers or component parts thereof may be substituted, the alternating current output in each case being compared with an arbitrarily chosen standard. It is thus possible to determine whether or not the elements tested meet the necessary requirements as to efficiency through the acoustic range.

The idea of varying the frequency by changing the inductance in the oscillation circuit of a generator to give a uniformly, continuously and cyclically varying frequency is not a part of this invention, but is the invention of another and is described and claimed in a copending application to F. W. Isles, Serial No. 328,626, filed Oct. 6, 1919, for oscillation generators for current of continuously varying frequencies.

The method of generating an alternating current of variable frequency which consists in cyclically varying the resonance of an oscillation circuit is covered in a divisional application of this case, filed Sept. 8, 1920, Serial No. 408,843, for method of generating an alternating current of variable frequency.

What is claimed is:

1. The method of testing the relative efficiency of a plurality of speech frequency translating devices which comprises energizing each of said devices in response to currents which uniformly vary in frequency over the frequency range of importance in speech and determining the response of each of said devices to said currents thereby testing each of said devices at the said frequencies of importance in speech.

2. The method of testing apparatus which comprises energizing said apparatus in response to currents which uniformly vary in frequency within the acoustic range, translating the response of said apparatus into alternating current, translating said current into a deflection, and in varying said frequency with sufficient rapidity to render said deflection steady.

3. A system comprising means for supplying a continuously varying frequency, a receiver responsive to said means, a transmitter responsive to said receiver, and means for indicating the intensity of the alternating current waves produced by said transmitter to determine the efficiency of a portion of said system.

4. A system comprising means for supplying a continuously varying frequency, a receiver responsive to said means, a transmitter responsive to said receiver, and a measuring device associated with said transmitter, the rate of variation of said frequency being sufficiently high to give a steady reading on said measuring device.

5. A generator of currents of varying frequency, a receiver diaphragm, means comprising a circuit associated with said generator for actuating said diaphragm and offering an impedance which varies for currents of different frequencies in a manner to compensate for the variation in response of said diaphragm to currents of different frequencies, whereby said diaphragm gives rise to sound waves of substantially constant intensity throughout the frequency range, and indicating means responsive to the actuation of said diaphragm.

6. Means for supplying currents which